(12) United States Patent
Chalom et al.

(10) Patent No.: US 6,366,701 B1
(45) Date of Patent: Apr. 2, 2002

(54) APPARATUS AND METHOD FOR DESCRIBING THE MOTION PARAMETERS OF AN OBJECT IN AN IMAGE SEQUENCE

(75) Inventors: Edmond Chalom, Highland Park; Sriram Sethuraman, Hightstown; Iraj Sodagar, North Brunswick, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/489,627

(22) Filed: Jan. 24, 2000

Related U.S. Application Data
(60) Provisional application No. 60/117,649, filed on Jan. 28, 1999.

(51) Int. Cl.[7] .............................. G06K 9/46; G06K 9/00
(52) U.S. Cl. ........................................ 382/236; 382/107
(58) Field of Search ................................ 382/192, 232, 382/180, 100, 103, 107, 199, 271, 282, 159, 153; 348/699

(56) References Cited

U.S. PATENT DOCUMENTS
5,521,843 A * 5/1996 Arman et al ................. 345/723
5,930,379 A * 7/1999 Rehg et al. .................. 385/107

FOREIGN PATENT DOCUMENTS
EP 0 805 405 A 5/1997 ........... G06F/17/30

OTHER PUBLICATIONS
International Searh Report for Int'l Appliction No. PCT/US00/02364 dated Jun. 13, 2000.
Jacek Nieweglowski, et al., A Novel Video Coding Scheme Based on Temporal Prediction Using Digital Image Warping, IEEE Transaction on Consumer Electronics, 39 (1993) Aug., No. 3, New York, US.

* cited by examiner

Primary Examiner—Jose L. Couso
Assistant Examiner—Duy M. Dang
(74) Attorney, Agent, or Firm—William J. Burke

(57) ABSTRACT

An apparatus and method for implementing object trajectory segmentation for an image sequence. Specifically, block-based motion vectors for a pair of adjacent frames are used to derive optical flow, e.g., affine, motion parameters. The object trajectory segmenter applies the optical flow motion parameters to form a new prediction or method for predicting the positions of all the points on an object over time within an interval. The new prediction is then applied and the result is compared with an error metric. The results from such comparison with the error metric will dictate the proper intervals (temporal boundaries) of the image sequence at which the motion parameters are valid for various key objects.

20 Claims, 7 Drawing Sheets

APPARATUS AND METHOD FOR DESCRIBING THE MOTION PARAMETERS OF AN OBJECT IN AN IMAGE SEQUENCE

This application claims the benefit of U.S. Provisional Application No. 60/117,649 filed on Jan. 28, 1999, which is herein incorporated by reference.

The invention relates to image processing for describing the motion of object(s) in image sequences, e.g., video. More particularly, the invention relates to an efficient framework for object trajectory segmentation, which in turn, can be employed to improve image processing functions, such as context-based indexing and retrieval of image sequences with emphasis on motion description.

BACKGROUND OF THE DISCLOSURE

With the explosion of available multimedia content, e.g., audiovisual content, the need for organization and management of this ever growing and complex information becomes important. Specifically, as libraries of multimedia content continue to grow, it becomes unwieldy in indexing this highly complex information to facilitate efficient retrieval at a later time.

By standardizing a minimum set of descriptors that describe multimedia content, content present in a wide variety of databases can be located, thereby making the search and retrieval more efficient and powerful. International standards such as Moving Picture Experts Group (MPEG) have embarked on standardizing such an interface that can be used by indexing engines, search engines, and filtering agents. This new member of the MPEG standards is named multimedia content description interface and has been code-named "MPEG-7".

For example, typical content description of a video sequence can be obtained by dividing the sequence into "shots". A "shot" can be defined as a sequence of frames in a video clip that depicts an event and is preceded and followed by an abrupt scene change or a special effect scene change such as a blend, dissolve, wipe or fade. Detection of shot boundaries enables event-wise random access into a video clip and thus constitutes the first step towards content search and selective browsing. Once a shot is detected, representative frames called "key frames" are extracted to capture the evolution of the event, e.g., key frames can be identified to represent an explosion scene, an action chase scene, a romantic scene and so on. This simplifies the complex problem of processing many video frames of an image sequence to just having to process only a few key frames. The existing body of knowledge in low-level abstraction of scene content such as color, shape, and texture from still images can then be applied to extract the meta-data for the key frames.

While offering a simple solution to extract meta-data, the above description has no motion-related information. Motion information can considerably expand the scope of queries that can be made about content (e.g., queries can have "verbs" in addition to "nouns"). Namely, it is advantageous to have additional conditions on known information based on color, shape, and texture descriptors, be correlated to motion information to convey a more intelligent description about the dynamics of the scene that can be used by a search engine. Instead of analyzing a scene from a single perspective and storing only the corresponding meta-data, it is advantageous to capture relative object motion information as a descriptor that will ultimately support fast analysis of scenes on the fly from different perspectives, thereby enabling the ability to support a wider range of unexpected queries. For example, this can be very important in application areas such as security and surveillance, where it is not always possible to anticipate the queries.

Therefore, there is a need in the art for an apparatus and method for extracting and describing motion information in an image sequence, thereby improving image processing functions such as content-based indexing and retrieval, and various encoding functions.

SUMMARY OF THE INVENTION

One embodiment of the present invention is an apparatus and method for implementing object trajectory segmentation for an image sequence, thereby improving or offering other image processing functions such as context-based indexing of the input image sequence by using motion-based information. More specifically, block-based motion vectors are used to derive optical flow motion parameters, e.g., affine motion parameters. These optical flow motion parameters are employed to develop a prediction that is used to effect object trajectory segmentation for an image sequence.

Specifically, optical flow (e.g., affine) object motion segmentation is initially performed for a pair of adjacent frames. Namely, optical flow motion parameters between adjacent frames that describe the position of each point on a region at each time instant are made available to the present object trajectory segmenter. The present invention is not limited by the method or model that is employed to provide the initial optical flow motion parameters between adjacent frames.

The object trajectory segmenter applies the optical flow motion parameters to form a new prediction or method for predicting the positions of all the points on an object over time within an interval. For example, the optical flow motion parameters are code fitted to form the new prediction. The new prediction is then applied and the result is compared with an error metric. For example, the error metric measures the sum of deviations in distance at each point on the region at each time instant based on the new prediction compared to the original predictions. The results from such comparison with the error metric will dictate the proper intervals (temporal boundaries) of the image sequence at which the motion parameters are valid for various key objects. In other words, it is important to detect what motion segments or temporal boundaries are for a key object. In doing so, the present object trajectory segmenter obtains two sets of important information: the motion parameter values that accurately describe the object's motion and for which frames the parameters are valid.

Namely, the optical flow (e.g., affine) motion parameters generated for each identified key object for each adjacent pair of frames are processed over an interval of the image sequence to effect object trajectory segmentation. Namely, motion trajectory such as direction, velocity and acceleration can be deduced for each key object over some frame interval, thereby providing an another aspect of motion information that can be exploited by query.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
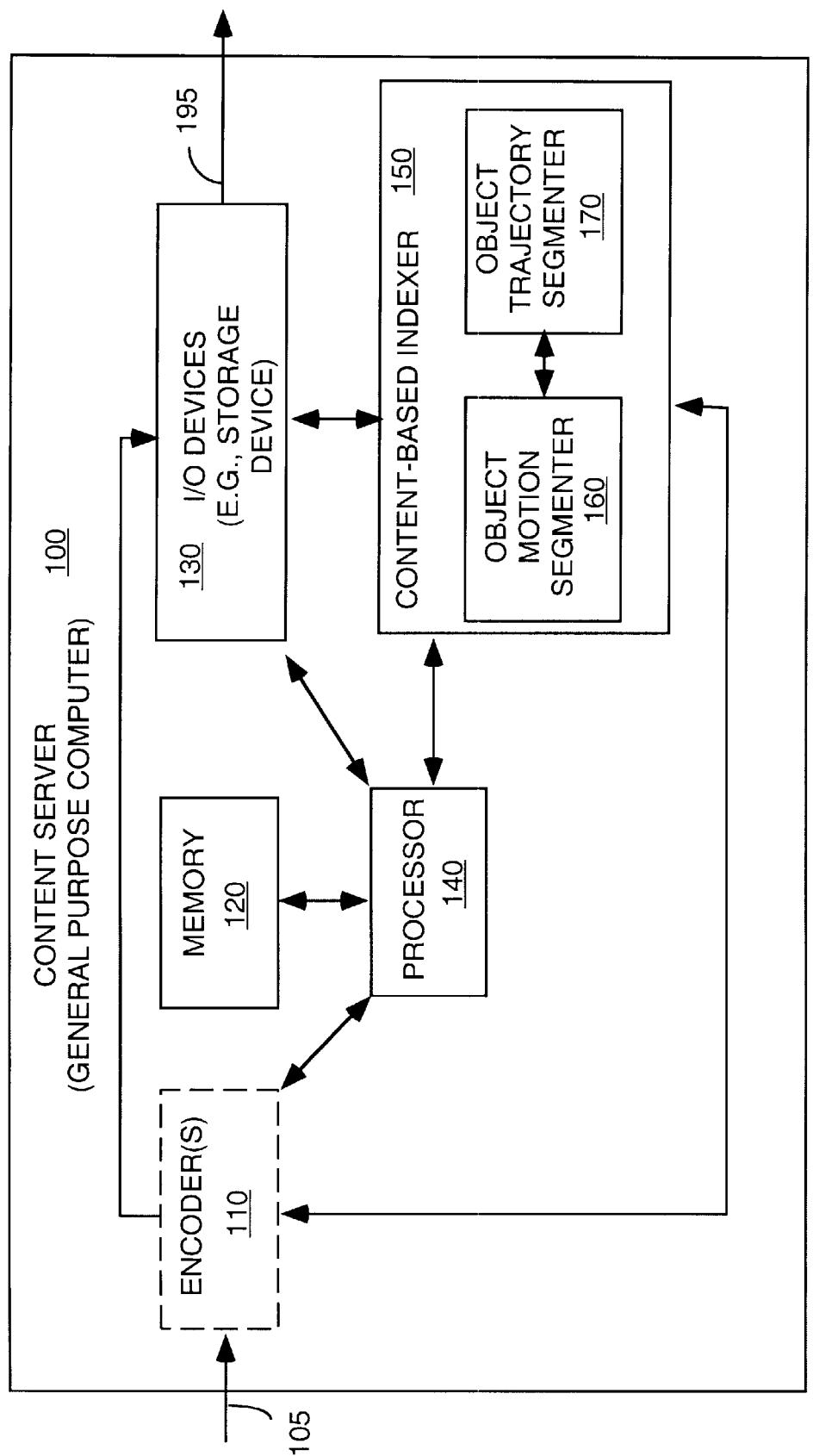
FIG. 1 depicts a block diagram of a content server of the present invention.

FIG. 1 depicts a block diagram of a content server 100 of the present invention. In one embodiment, the content server 100 is implemented using a general purpose computer. Thus, illustrative content server 100 comprises a processor (CPU) 140, a memory 120, e.g., random access memory (RAM), a context-based indexer 150, an optional encoder(s) 110 and various input/output devices 130, (e.g., a keyboard, a mouse, an audio recorder, a camera, a camcorder, a video monitor, any number of imaging devices or storage devices, including but not limited to, a tape drive, a floppy drive, a hard disk drive or a compact disk drive).

It should be understood that the encoder(s) 110 and the content-based indexer 150 can be implemented jointly or separately. Namely, the encoder(s) 110 and the content-based indexer 150 can be physical devices that are coupled to the CPU 140 through a communication channel. Alternatively, the encoder(s) 110 and the content-based indexer 150 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. As such, the encoder(s) 110 and the content-based indexer 150 (including associated data structures) of the present invention can be stored on a computer readable medium, e.g., RAM memory, magnetic or optical drive or diskette and the like.

In operation, various multimedia information are received on path 105 and stored within a storage device 130 of the content server 100. The multimedia information may include, but is not limited to, various image sequences such as complete movies, movie clips or shots, advertising clips, music videos and the like. The image sequences may or may not include audio streams or data streams, e.g., closed captioning and the like.

Due to the explosion of available multimedia content and their large size, the input information on path 105 may undergo a compression process that is illustrated as one or more optional encoders 110. The encoders 110 may comprise video and audio encoders, e.g., MPEG-like encoders that are designed to reduce spatial and temporal redundancy. However, any number of compression schemes can be employed and the present invention is not so limited to any particular scheme. The encoders 110 are optional since the input information may have already undergone various compression processes outside of the content server, where the input stream is already in a compressed format. In such implementation, the encoders 110 can be omitted.

The content-based indexer 150 is employed to analyze the input information and to provide an efficient index to the large quantity and often complex multimedia content that are stored on the storage device(s) 130. The content-based indexer 150 of the present information is tasked to provide an indexing method and associated data structures that will allow an efficient method to categorize and then to allow retrieval of complex multimedia content quickly on path 195. More particularly, the present content-based indexer 150 employs motion information to allow more complex queries that employ "verbs" (e.g., relative motion information of an object), instead of just "nouns" (e.g., the color of an object).

For example, a query for an image sequence containing a blue background, e.g., a blue sky, may generate a large number of positive query hits, thereby reducing the effectiveness of the query function. In contrast, if the query can be modified for searching an image sequence containing a blue background with an object moving in the foreground at a high velocity to the left, then the response to the query may produce a highly focused set of positive responses, e.g., an image sequence having an aircraft moving rapidly across a blue sky background.

The content-based indexer 150 comprises an object motion segmenter 160 and an object trajectory segmenter 170. In brief, the object motion segmenter 160 is employed to broadly determine the relative motion of objects within each frame, wherein the object trajectory segmenter 170 is employed to broadly determine the trajectory of the objects within a number of frames within an image sequence.

Figure 2:
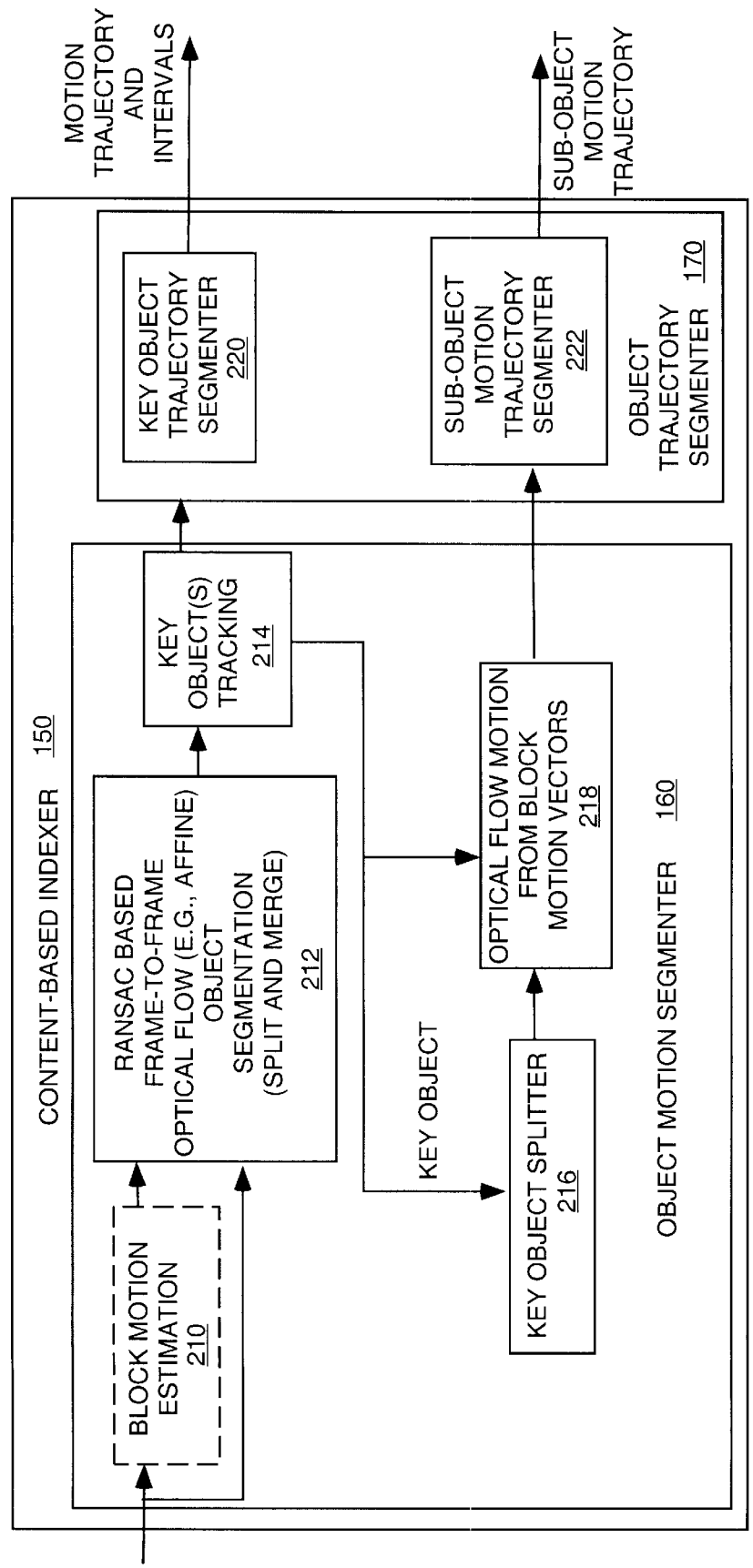
FIG. 2 depicts a block diagram of a context-based indexer of the present invention.

FIG. 2 depicts a block diagram of a context-based indexer 150 of the present invention comprising an object motion segmenter 160 and an object trajectory segmenter 170. The object motion segmenter 160 comprises a block-based motion estimator 210, an optical flow (e.g., affine) segmenter 212, a key object tracker 214, a key object splitter 216, and an optical flow (e.g., affine) segmenter 218. The object trajectory segmenter 170 comprises a key object trajectory segmenter 220 and a sub-object trajectory segmenter 222. The broad functions performed by these modules are briefly described with reference to FIG. 2. Detailed descriptions of these functions are provided below with reference to the flowcharts and other diagrams of FIGS. 3–6.

In operation, an image sequence is received into block-based motion estimator 210, where motion information, e.g., block-based motion vectors, are computed from the image sequence for each frame. However, if the content server 100 has an external encoder 110 or the input image sequence already contains motion information, i.e., where the motion vectors are encoded with the image sequence, then block-based motion estimator 210 can be omitted. Namely, the block based motion information can be extracted from the compressed bitstream itself or is provided by other modules of the content server 100, thereby relieving the object motion segmenter 160 from having to compute the motion vectors.

In turn, the optical flow (e.g., affine) segmenter 212 applies the motion vector information to generate "affine motion parameters". Although the present invention is described below using the affine motion model, it should be understood that other optical flow models can be employed as well. The affine motion model is disclosed by J. Niewe-glowski et al. in "A Novel Video Coding Scheme Based On Temporal Prediction Using Digital Image Warping", IEEE Trans. Consumer Electronics, Vol. 39, 3, pp. 141–150, August, 1993, which is incorporated herein by reference. The affine motion model constructs a prediction image or frame from a previous image by applying a geometric transformation known as "image warping". The transform specifies a spatial relationship between each point in the previous and prediction images.

Generally, motion compensation using block matching provides a good overall performance for translational motion. However, the block-matching motion estimation is a poor performer when motion contains rotational or scaling components (e.g., zooming or rotating an image).

In contrast, the affine motion model (affine transformation) is defined by six parameters ($a_1$ to $a_6$) and is expressed as:

$$[x, y, 1] = [u, v, 1] \begin{bmatrix} a_1 & a_4 & 0 \\ a_2 & a_5 & 0 \\ a_3 & a_6 & 1 \end{bmatrix} \quad (1)$$

where (x, y) are pixel coordinates in the previous frame and (u, v) are the coordinates of a given pixel in the prediction frame. A detailed discussion on determining the six parameters is presented in the J. Nieweglowski et al. reference. The affine relationship is characterized by the six parameters. Thus, the affine motion model is generally more effective in predicting motions such as translation, scaling, and rotation which are often observed not only in natural sequences, but also in synthetic scenes using digital effects.

Namely, the affine segmenter 212 is tasked with the identification, segmentation, and generation of affine parameters for the "key objects" for each frame of the image sequence. Key objects can be viewed as objects that are sufficiently significant that tracking of their motion is important for the purpose of indexing or other image processing functions. Typically, key objects are identified in part based on their size, i.e., large objects are typically key objects, whereas small objects are not key objects. Thus, a moving vehicle is typically a key object whereas a small moving insect in the background is not a key object. Nevertheless, the requirements for qualifying key objects are application specific, and are defined by the user of the present invention. Once key objects are defined, the motions of these key objects are then tracked by key object tracker 214.

Optionally, if the motion information of components of each key object is also important for the purpose of indexing or other image processing functions, additional processing is performed by the key object splitter 216. Specifically, a key object can be segmented into sub-objects and the motion information for these sub-objects can be tracked individually. For example, a key object of a human being can be segmented into six sub-objects comprising a head, a body and four limbs. Thus, a query can now be crafted to search for "actions" that are relative to sub-objects within a key object, e.g., searching for an image sequence where a limb of a person is raised above the head of the person and so on.

Although some key objects can be readily split into well-defined sub-objects, other key objects may require further processing to identify the boundaries of sub-objects. Thus, the key objects information can be forwarded from the key object tracker 214 directly to an affine segmenter 218 for identification and segmentation of "sub-objects" for each key objects. Thus, affine segmenter 218 is also tasked with generating affine motion parameters for the sub-objects. It should be noted that although the content-based indexer illustrates two affine segmenters 212 and 218, it should be understood that a single affine segmenter can be implemented to perform both levels of affine processing (i.e., key object and sub-object processing).

In turn, the motion information from key object tracker 214 is forwarded to a key object trajectory segmenter 220. Although it is possible to maintain and track the motion information, e.g., the affine motion parameters, for each key object, it has been found that storing such motion information requires a substantial storage requirement. Thus, the motion information for each key object is forwarded to the key object trajectory segmenter 220, where motion trajectory information and intervals (frame intervals) are generated for each key object. Namely, the motion information is summarized into "key object trajectory information", e.g., direction, velocity, acceleration and the like within some defined intervals (over a number of frames). This allows the motion information to be captured and stored in a format that allows for efficient motion-based indexing (or other image processing) of multimedia content. Optionally, motion information for each sub-object is forwarded to the sub-object trajectory segmenter 222, where motion trajectory information and intervals (frame intervals) are generated for each sub-object.

Figure 3:
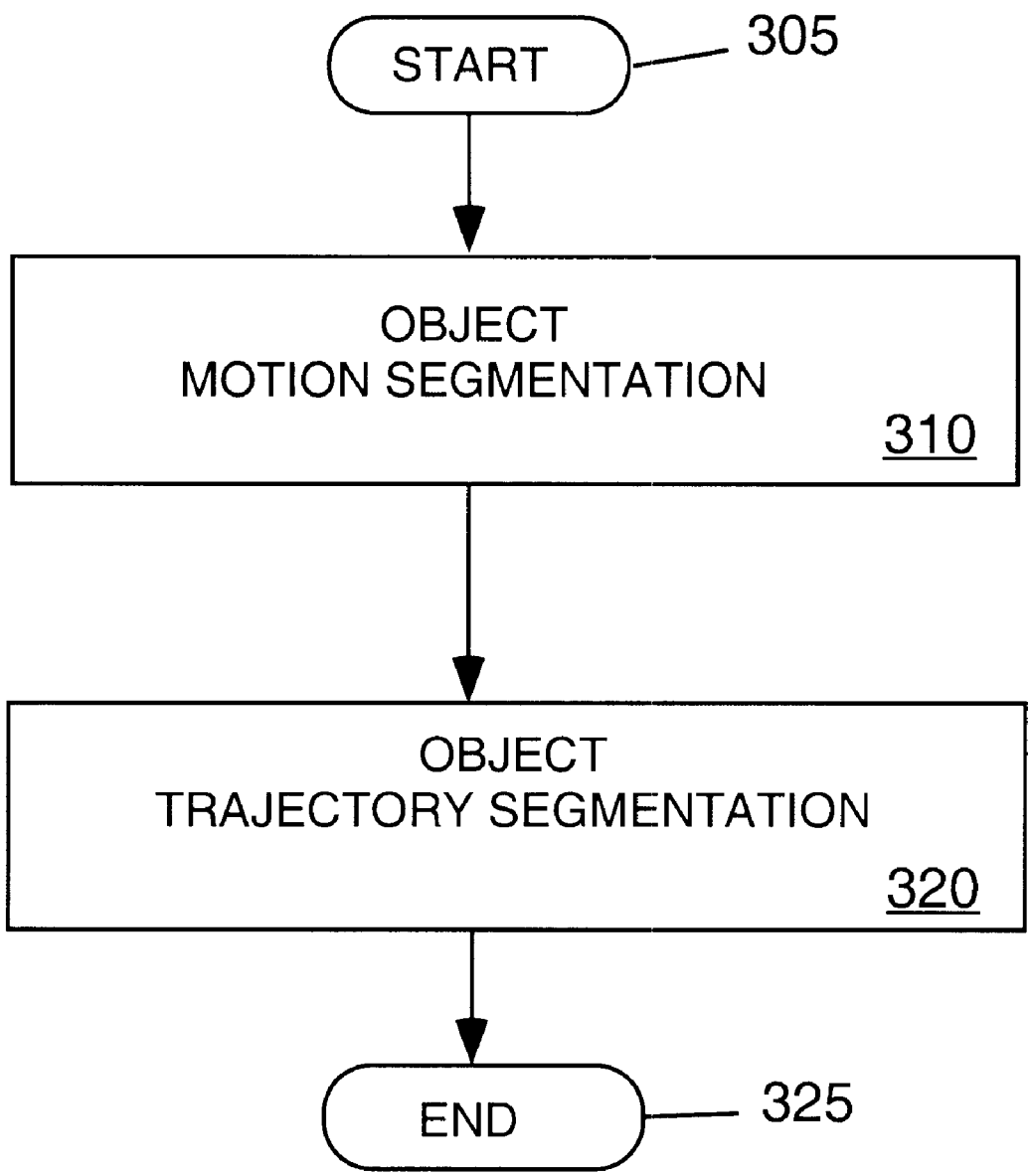
FIG. 3 depicts a flowchart of a method for implementing context-based indexing of an input image sequence by using motion-based information.

FIG. 3 depicts a flowchart of a method 300 for implementing affine segmentation, thereby improving or offering other image processing functions such as context-based indexing of an input image sequence by using motion-based information. More specifically, method 300 starts in step 305 and proceeds to step 310 where affine object motion segmentation is performed. Namely, key objects are identified within some intervals of the image sequence (also known as a "shot" having a number of frames of the input image sequence) and their motion information is extracted and tracked over those intervals. In step 310, affine motion parameters are generated for each identified key object.

In step 320, the affine motion parameters generated for each identified key object for each adjacent pair of frames are processed over an interval of the image sequence to effect object trajectory segmentation. Namely, motion trajectory such as direction, velocity and acceleration can be deduced for each key object over some frame interval, thereby providing an another aspect of motion information that can be exploited by query. Method 300 then ends in step 325.

Figure 4:
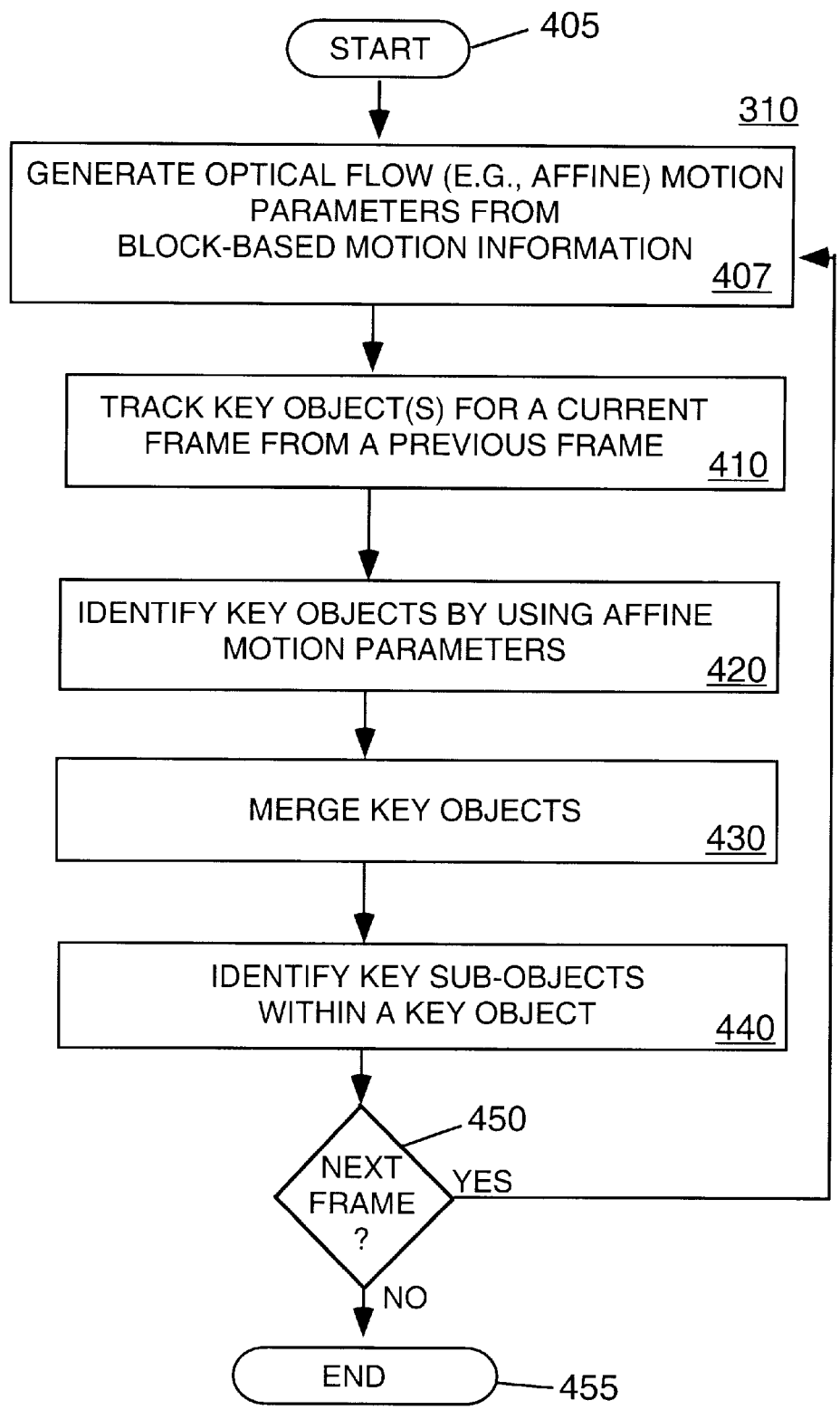
FIG. 4 depicts a flowchart of a method for implementing optical flow (e.g., affine) object motion segmentation.

FIG. 4 depicts a flowchart of a method 310 for implementing affine object motion segmentation. Namely, method 310 is a more detailed description of step 310 of FIG. 3.

Method 310 starts in step 405 and proceeds to step 407, where method 310 generates affine motion parameters from block-based motion information. Namely, a random number of blocks are selected where their block-based motion vectors are employed to derive affine motion parameters as discussed below.

In step 410, method 310 attempts to track one or more identified key objects from a previous frame, i.e., obtain the label of a key object from a previous frame. Namely, once key objects have been identified for a pair of adjacent frames as discussed in step 420 below, it may not be necessary to again apply the same detection step for the next frame in the image sequence. Namely, for a new frame, block based motion vectors can be employed to rapidly look backward to see whether the blocks point to a previously labeled key object. If so, such blocks will retain the same labeling as in the previous frame. For example, if four (4) key objects have been determined for a pair of adjacent frames and if the next frames contains five (5) connected regions, then motion vectors are employed to determine whether four out of the five connected regions in the present frame correlate to the four identified key objects. If so, then only the remaining single connected region is tested in accordance with step 420 to determine whether it is a key object. This method of tracking significantly reduces the computational overhead, i.e., key objects are tracked in the image sequence until the objects can no longer be tracked, e.g., the object has become too small or occluded. However, if no key objects can be identified, step 410 is skipped, as in the case where method 310 processes a new shot.

In step 420, method 310 identifies the key objects within a pair of adjacent frames of the input image sequence. In one embodiment, the key objects are identified by determining whether a block is within the affine object flow.

In step 430, method 310 may optionally merge identified key objects. For example, the identified key objects may be too small to be significant for image processing purposes, i.e., indexing in a particular application, e.g., a single bird can be merged with other birds within the frame to form a key object of a flock of birds.

In step 440, method 310 may optionally identify sub-objects within key objects. In contrast to step 430 above, the identified key object may have significant motion information associated with its components (sub-objects) for indexing purposes in a particular application. For example, an identified key object comprising of a human being may comprise sub-objects, i.e., the person's limb, where the relative motion information of the sub-objects is important for indexing the shot.

In step 450, method 310 queries if there are additional frames associated with the present "shot". If the query is negatively answered, then method 310 ends to step 455. If the query is positively answered, then method 310 proceeds to step 407, where the affine motion parameters are generated for the next pair of adjacent frames. Namely, affine segmentation has to be performed between successive pairs of frames. The reason is that the affine motion parameters are needed at each instant to model the trajectory and to also handle new objects/occlusions.

Method 310 then ends in step 455 when all frames have been processed. A detailed description of a novel object motion segmenter 160 is described in U.S. patent application entitled "Apparatus And Method For Context-Based Indexing And Retrieval Of Image Sequences" with attorney docket SAR 13430, which is herein incorporated by reference and is filed simultaneous herewith.

Figure 5:
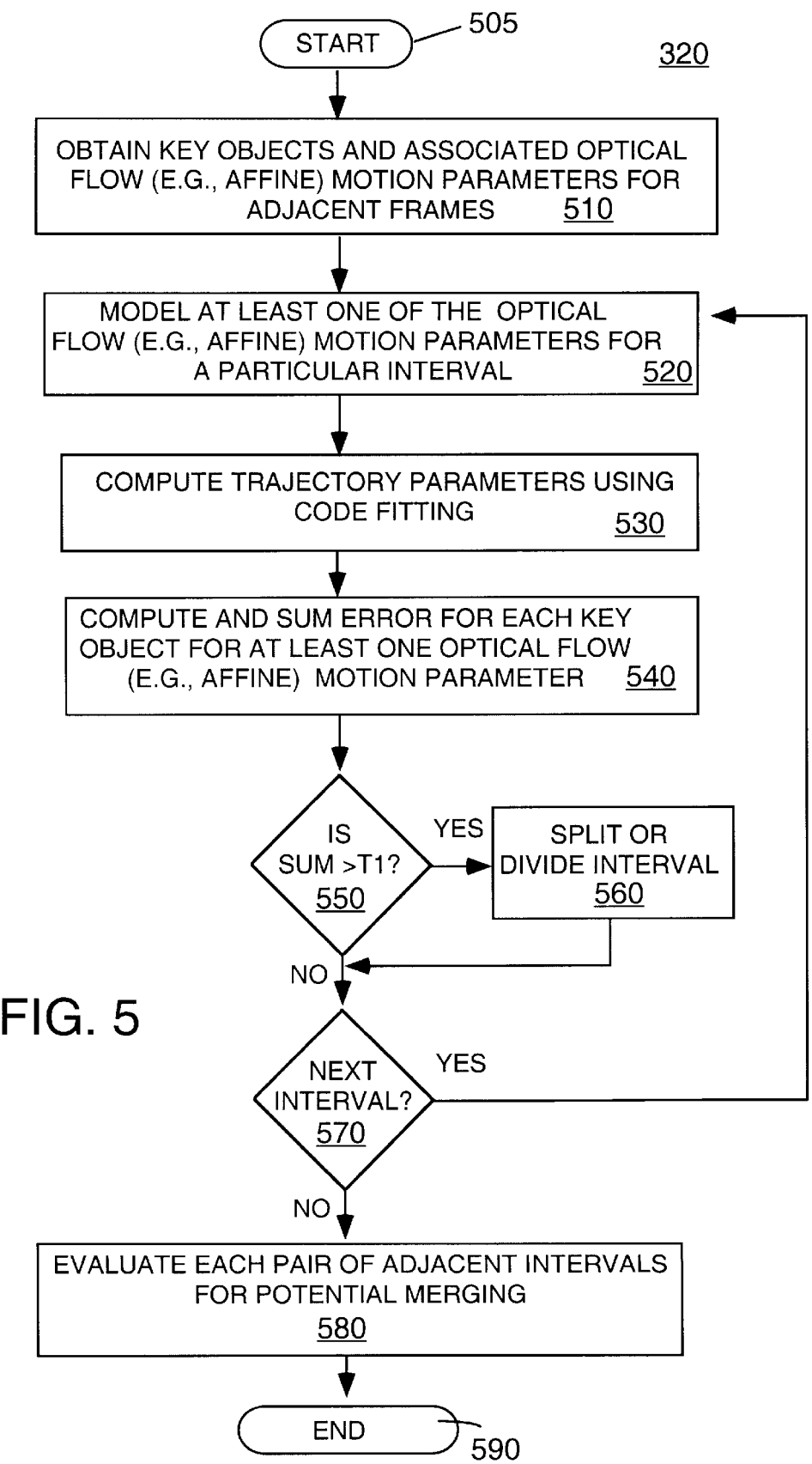
FIG. 5 depicts a flowchart of a method for implementing optical flow (e.g., affine) trajectory segmentation.

FIG. 5 depicts a flowchart of a method 320 for implementing optical flow (e.g., affine) trajectory segmentation. More specifically, method 320 is a more detailed description of the steps 320 of FIG. 3 and the affine motion model is employed to describe the present invention.

Method 320 starts in step 505 and proceeds to step 510 where affine motion parameters between adjacent frames to describe the position of each point on a region at each time instant are obtained as discussed above in FIG. 4. It should be noted that various methods exist for determining the motion information for regions within a frame, e.g., various optical flow techniques. As such, the present invention is not limited by a particular method or model that is employed to provide the initial optical flow motion parameters between adjacent frames of an interval of the image sequence. Namely, as to the present trajectory segmenter, it is assumed that a "segmentation" or delineation between objects is previously computed and is known.

In step 520, method 320 models at least one of the affine motion parameters for a particular or selected interval. For example, derive affine motion parameters between a subsampled set of frames in the chosen interval depending on the order of the fit, e.g., quadratic expressions require at least 2 data sets, etc. Specifically, decompose affine motion parameters into its components, namely, scale, rotation, shear, and translation. Assume different temporal models for each component depending on its nature. For example, the translation can be modeled using a polynomial, e.g., quadratic in time. The scale can be modeled to vary linearly over time. The rotation can be modeled using a constant angular velocity assumption.

In one embodiment, a model is used that can describe the average position of the object in each frame, $\{x(t),y(t)\}$, as follows:

$$x(t)=0.5a_x t^2+v_x t+x_o$$
$$y(t)=0.5a_y t^2+v_y t+y_o \quad (2)$$

where $a_x$ and $a_y$ represent acceleration, $v_x$ and $v_y$ represent velocity, and $x_o$ and $y_o$ represent the initial position. The method begins with the initial estimate that the entire scene can be described by one set of motion parameters. In other words, the selected interval is the entire image sequence.

Figure 6:
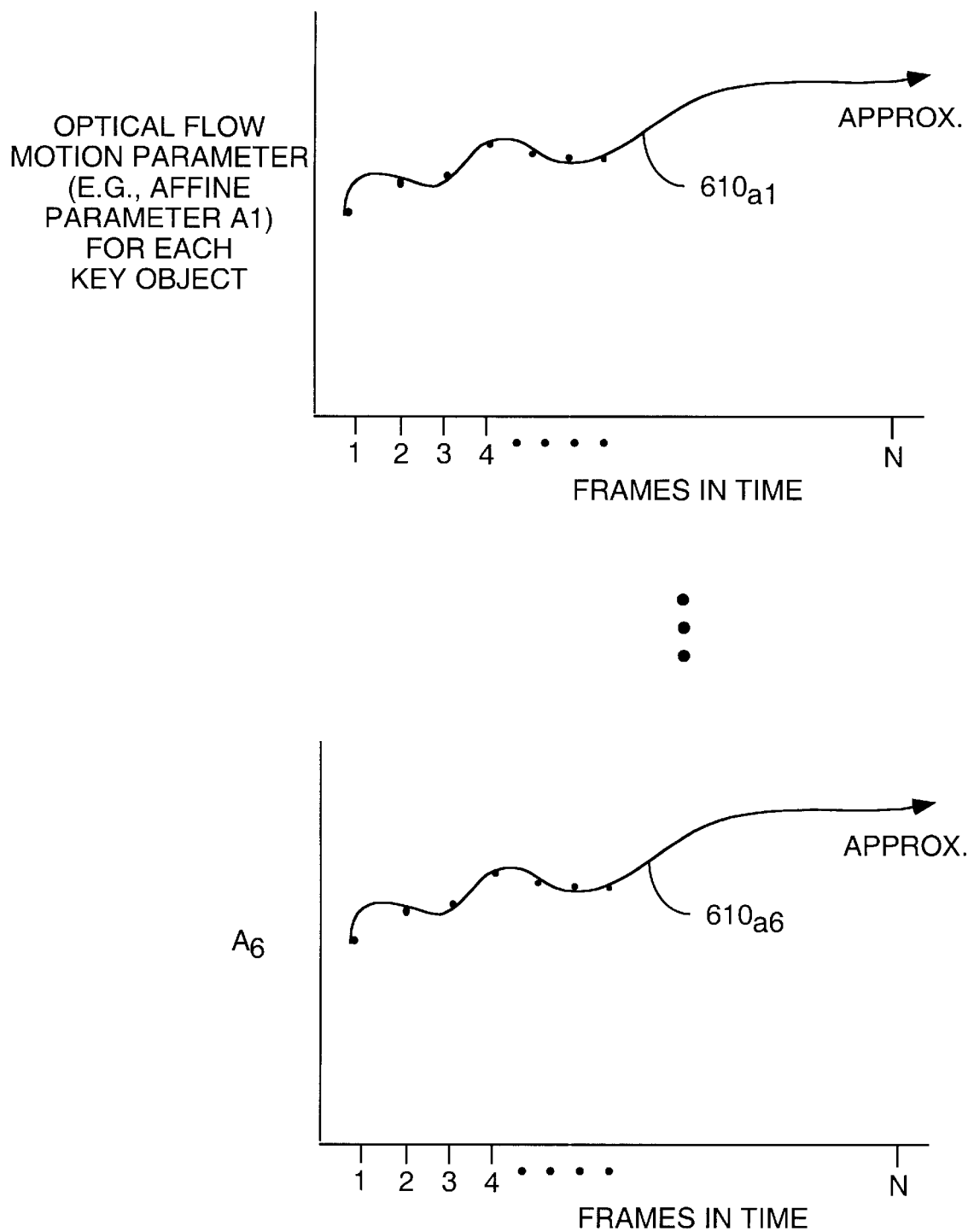
FIG. 6 illustrates code fitting of optical flow motion parameters to generate trajectory parameters.

In step 530, method 320 computes the trajectory parameters for the selected interval using code fitting, i.e., using the subsampled affine motions to obtain the coefficients for the chosen prediction model, represented by curve(s) 610$_{a1}$-$_{a6}$, as shown in FIG. 6. Namely, a new parametric expression or prediction is developed to predict the position of all the points on the object over time within a selected interval.

In step 540, method 320 computes and sums the errors for each key object for at least one of the affine motion parameter. Namely, an error metric is chosen that measures the sum of deviations in distance at one or more points on the region at each time instant based on this new prediction as compared to the original positions.

In step 550, method 320 queries whether the summed error is greater than a threshold "T1". If the query is positively answered, then method 320 proceeds to step 560, where the selected interval is split or divided into two intervals at the location of maximum frame error. If the query is negatively answered, then method 320 proceeds to step 570.

Namely, the new trajectory parameter set is calculated. If the average error (averaged over the time interval for which the model is valid) exceeds a threshold T1, then the sequence or selected interval is split into two temporal sections at the frame where there is a maximum error.

In step 570, method 320 queries whether there is a next interval. If the query is positively answered (as in the case when a split operation occurs in step 560), then method 320 returns to step 520, where steps 520–560 are repeated for each new interval, i.e., two new intervals are generated for each split operation. If the query is negatively answered, then method 320 proceeds to step 580. Namely, all intervals have been evaluated for splitting. Namely, method 320 continues to calculate the motion parameters of each interval as well as the error for that time interval, and continues to perform a temporal split if the average error exceeds the threshold. The iteration stops either when the time interval is smaller than 3 frames or when the error is below the threshold.

Figure 7:
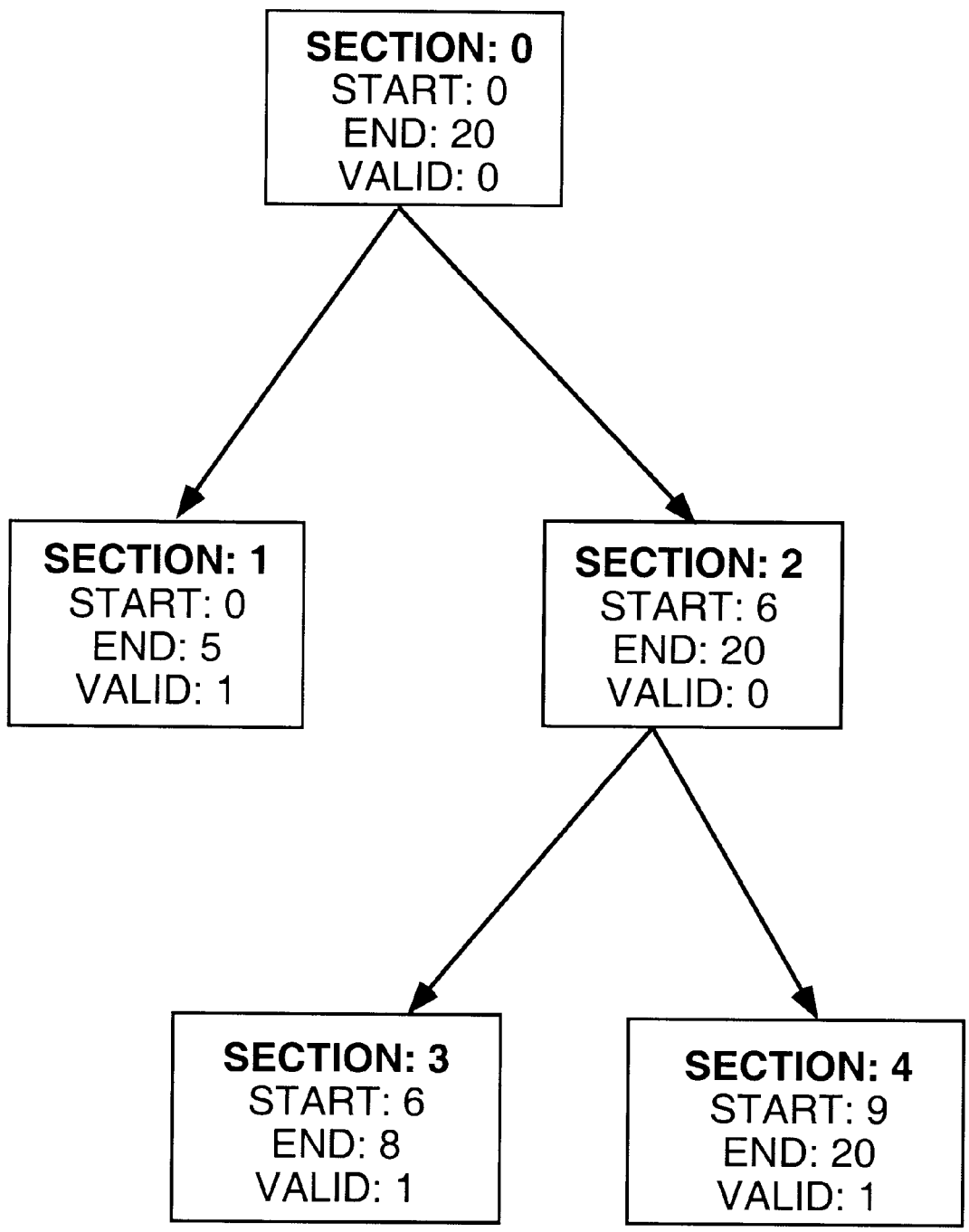
FIG. 7 illustrates a block diagram of an example as to which frames might be the temporal split points for an object that exists in a video sequence comprising of 20 frames.

FIG. 7 illustrates a block diagram of an example as to which frames might be the temporal split points for an object that exists in a video sequence comprising of 20 frames. In the above examples, Sections or segments 0 and 2 are considered not "valid" because these sections are required to be split. Where as Sections 1, 3 and 4 are valid since no splitting is required. Only the motion parameters of the valid sections are stored, and passed on to the Merge subroutine. It should be noted that the start and end frames of Sections 1, 3, and 4 are contiguous. As described below, it is plausible that Sections 1 and 3 can be combined into a single section whose motion parameters fall within the error threshold.

In step 580, method 320 evaluates each pair of adjacent intervals for potential merging. Specifically, adjacent intervals are merged, if a joint prediction model for two adjacent intervals results in a normalized error below a threshold "T2". This step is repeated for all intervals recursively until any further merging increases the normalized error in the merged interval above the threshold, T2. In other words, once the scene has been split into many time intervals, a merge operation is applied to all the "valid" time intervals. The merge operation looks at successive temporal segments or intervals, and calculates a new set of trajectory parameters for the two selected segments, and decides to merge the two segments only if the error (of the parametric motion model of the merged segments) falls below a threshold.

Method 320 ends in step 590 when all possible merge operations have been performed. Thus, method 320 of the present invention provides an effective way of describing the motion parameters of an object within a sequence, and detecting the temporal boundaries for which to update the motion parameters, given a motion model. These resulting descriptors can then be exploited by image processing functions, e.g., applied to a video sequence for indexing or searching tool, to detect objects or events consisting of object interactions.

An example illustrating the importance of the split and merge operations is as follows: Suppose a sequence starts with frames 0–20, and it has been determined that the best split point is at frame 5. After a split operation is performed at the specified location, two segments or intervals, frames 0–5 and 6–20 remain. If frames 0–5 need not be split, and the best split point for the interval from frames 6–20 occurs at frame 8, then after another split operation, three segments: frames 0–5, 6–8, and 9–20 remain. Once all segments no longer need to be split, a successive check is performed to determine if adjacent segments can be merged. Thus, in the above examples, a check is performed to determine if the first two segments (frames 0–5 and frames 6–8) could be merged into one segment forming frames 0–8, thus if the merge occurs a total of two segments, frames 0–8 and frames 9–20 are obtained. It should be noted that in the first pass of the split operation, the best split point was at frame 5 and not at frame 8. This discrepancy is due to the fact that real objects may not exactly follow a quadratic trajectory, so the point of maximum error may not always correspond to the point where the motion model parameters need to be updated. It should be noted that the above example and psuedocode below are for the quadratic model for the position of object only.

Psuedocode Outline:

Struct Section{
  StartFrame;
  EndFrame;
  MotionParameters;
  Error;
  ValidSection;}
Main(Object) {
  AvgPos=average spatial position of Object at each frame;
  Initialize NumSections;
  Initialize SectionParameters; /* An array of type Section */
  NumSections=
Split(SectionParameters,NumSections ,AvgPos, Threshold);
  NumSections=
Merge(SectionParameters,NumSections,AvgPos, Threshold);}
Split(SectionParameters,NumSections,AvgPos, Threshold){
  Calculate NumFrames in current interval;
  if (NumFrames<=3)
    Calculate and store SectionParameters [NumSections];/*
parameters of the current Section */
  else{
    Calculate and store SectionParameters [NumSections];
    if (AvgError>T){
      Find location of max error of parametric model;
      /*this indicates our split point */
      NumSections++;
      Set StartFrame and EndFrame of
SectionParameters[NumSections]; /*based on location of split point */
  NumSections=
Split(SectionParameters,NumSections,AvgPos, Threshold);
  NumSections++;
  Set StartFrame and EndFrame of
SectionParameters[NumSections]; /*based on location of split point */
  NumSections=
Split(SectionParameters,NumSections,AvgPos, Threshold);}}}
Merge(SectionParameters,NumSections,AvgPos, Threshold) {
  For (CurrentSection=0; CurrentSection<NumSections-1;
CurrentSection++)
  while (CurrentSection and NextSection can be merged into one){
  /*based on calculating MergedError<Threshold */
    Calculate and store SectionParameters [CurrentSection];
    Shift SectionParameters[NextSection+1] through
SectionParameters[NumSections] down 1 index;
    NumSections—;}}

The above method illustrates a general approach that allows for modeling of the object's motion via any parametric model. As long as some kind of error metric can be computed to determine whether or not the object's true motion is well described by the parametric model. The same kind of split and merge technique can be used to find the boundary points of when the model's parameters need to be updated. Although the present invention is described using an affine motion model that describes an object's translational, rotational, shear, and zoom characteristics, it is not so limited.

Below are the standard 2-dimensional affine motion equations, where $v_x$ and $v_y$ represent the velocity, C and F represent the translational motion components, and A, B, C, and F describe the rotational, shear, and zoom components:

$$v_x = Ax + By + C$$
$$v_y = Dx + Ey + F \tag{3}$$

It should be noted that the above-discussed thresholds are application specific as each application can have different levels of tolerance to errors in trajectory. The threshold that can be used for the above quadratic case is as follows: If (sum of deviation in distance over all points in the interval)/(Number of points in the interval)>0.9, then split. Similarly, if (sum of deviation in distance over all points in the interval)/(Number of points in the interval)<0.9, then merge.

Although the present object motion segmentation and object motion trajectory segmentation are described above for improving the indexing and retrieval of image sequences, it should be understood that the present invention can be employed to improve or provide other image processing functions. For example, the present invention can be employed in image processing functions, e.g., the synthesis of content from object trajectory (for quick preview) given the initial texture.

Furthermore, although the present invention is described above in terms of objects, it should be understood that an object is broadly defined to be a region of interest having varying sizes depending on the application. Similarly, although the present invention is described above in terms of blocks such as macroblocks, it should be understood that a block is broadly defined to be a block of varying sizes depending on the specific application.

Although various embodiments which incorporate the teachings of the present invention have been shown and described in detail herein, those skilled in the art can readily devise many other varied embodiments that still incorporate these teachings.

What is claimed is:

1. A method for performing object trajectory segmentation for an image sequence having a plurality of frames, said method comprising the steps of:
   a) obtaining at least one optical flow motion parameter for at least one pixel of an object within the image sequence;
   b) choosing a model for the trajectory of said at least one optical flow motion parameter as a function of time over an interval of said image sequence;
   c) determining trajectory model parameters from said modeled optical flow motion parameter for said interval of said image sequence; and
   d) evaluating said trajectory model parameters to determine if said interval of said image sequence is to be split, wherein said split operation is applied by dividing said interval of said image sequence into at least two separate intervals of frames.

2. The method of claim 1, further comprising the step of:
   e) repeating steps b) through d) for each newly created interval resulting from said split operation.

3. The method of claim 2, further comprising the step of:
   f) evaluating said trajectory model parameters of two adjacent intervals to determine if said two intervals of said image sequence are to be merged.

4. The method of claim 3, wherein said evaluating step f) evaluates said trajectory model parameters against a threshold to determine if said two intervals of said image sequence are to be merged.

5. The method of claim 3, further comprising the steps of:
   g) indexing said object of the image sequence in accordance with said trajectory model parameters and said intervals.

6. The method of claim 5, wherein said indexing step g) indexes said object of the image sequence in accordance with said trajectory model parameters and said intervals in conjunction with a spatial information associated with said object.

7. The method of claim 3, wherein said at least one optical flow motion parameter is at least one of a plurality of affine motion parameters.

8. The method of claim 7, wherein said plurality of affine motion parameters corresponds to scale, rotation, shear and translation.

9. The method of claim 1, wherein said modeling step b) employs a polynomial model over time.

10. The method of claim 9, wherein said modeling step b) employs a linear model over time.

11. The method of claim 9, wherein said modeling step b) employs a quadratic model over time.

12. The method of claim 11, wherein said quadratic model over time is expressed as:

$$x(t)=0.5a_xt^2+v_xt+x_o$$

$$y(t)=0.5a_yt^2+v_yt+y_o$$

where $a_x$ and $a_y$ represent acceleration, $v_x$ and $v_y$ represent velocity, and $x_o$ and $y_o$ represent an initial position.

13. The method of claim 1, wherein said evaluating step d) evaluates said trajectory model parameters against a threshold to determine if said interval of said image sequence is to be split.

14. The method of claim 13, wherein said evaluating step d) applies said split operation at a location of maximum error.

15. An apparatus for performing object trajectory segmentation for an image sequence having a plurality of frames, said apparatus comprising:
   means for obtaining at least one optical flow motion parameter for at least one pixel of an object within the image sequence;
   means for choosing a model for the trajectory of said at least one optical flow motion parameter as a function of time over an interval of said image sequence;
   means for determining trajectory model parameters from said modeled optical flow motion parameter for said interval of said image sequence; and
   means for evaluating said trajectory parameters to determine if said interval of said image sequence is to be split, wherein said split operation is applied by dividing said interval of said image sequence into at least two separate intervals of frames.

16. The apparatus of claim 15, wherein said evaluation means further evaluating said trajectory model parameters of two adjacent intervals to determine if said two intervals of said image sequence are to be merged.

17. A computer-readable medium having stored thereon a plurality of instructions, the plurality of instructions including instructions which, when executed by a processor, cause the processor to perform the steps comprising of:
   a) obtaining at least one optical flow motion parameter for at least one pixel of an object within the image sequence;
   b) choosing a model for the trajectory of said at least one optical flow motion parameter as a function of time over an interval of said image sequence;

c) determining trajectory model parameters from said modeled optical flow motion parameter for said interval of said image sequence; and d) evaluating said trajectory model parameters to determine if said interval of said image sequence is to be split, wherein said split operation is applied by dividing said interval of said image sequence into at least two separate intervals of frames.

18. The computer-readable medium of claim 17, further comprising the step of:

f) evaluating said trajectory model parameters of two adjacent intervals to determine if said two intervals of said image sequence are to be merged.

19. The computer-readable medium of claim 17, wherein said at least one optical flow motion parameter is at least one of a plurality of affine motion parameters.

20. The computer-readable medium of claim 17, wherein said modeling step b) employs a polynomial model over time.

* * * * *